United States Patent
Lin (10) Patent No.: US 9,537,861 B2
(45) Date of Patent: Jan. 3, 2017

(54) METHOD OF MUTUAL VERIFICATION BETWEEN A CLIENT AND A SERVER

(71) Applicant: Gerard Lin, Los Gatos, CA (US)

(72) Inventor: Gerard Lin, Los Gatos, CA (US)

( * ) Notice: Subject to any disclaimer, the term of this patent is extended or adjusted under 35 U.S.C. 154(b) by 0 days.

(21) Appl. No.: 14/749,915

(22) Filed: Jun. 25, 2015

(65) Prior Publication Data

US 2015/0381618 A1    Dec. 31, 2015

Related U.S. Application Data

(60) Provisional application No. 62/018,089, filed on Jun. 27, 2014.

(51) Int. Cl.
*H04L 9/32* (2006.01)
*H04L 29/06* (2006.01)

(52) U.S. Cl.
CPC ....... *H04L 63/0869* (2013.01); *H04L 63/0807* (2013.01); *H04L 63/0846* (2013.01)

(58) Field of Classification Search
None
See application file for complete search history.

(56) References Cited

U.S. PATENT DOCUMENTS

| | | | | |
|---|---|---|---|---|
| 7,418,596 | B1 * | 8/2008 | Carroll | H04L 63/068 380/247 |
| 7,861,077 | B1 * | 12/2010 | Gallagher, III | G06F 21/33 713/155 |
| 9,325,696 | B1 * | 4/2016 | Balfanz | H04L 63/0815 |
| 2002/0138728 | A1 * | 9/2002 | Parfenov | H04L 63/0815 713/170 |
| 2009/0198997 | A1 | 8/2009 | Yeap et al. | |
| 2010/0242102 | A1 * | 9/2010 | Cross | G06F 21/32 726/7 |
| 2012/0209778 | A1 | 8/2012 | Delany | |
| 2012/0323717 | A1 | 12/2012 | Kirsch | |
| 2014/0082715 | A1 * | 3/2014 | Grajek | G06F 17/30876 726/8 |

OTHER PUBLICATIONS

Outgoing International Search Report along with an Written Opinion dated Oct. 9, 2015.

* cited by examiner

*Primary Examiner* — Brandon Hoffman
(74) *Attorney, Agent, or Firm* — WPAT, P.C., Intellectual Property Attorneys; Anthony King (57) ABSTRACT

A method of mutual verification between a client and a server is disclosed. The method comprises receiving a request via a telecommunication link, the request comprising an address of the server; receiving a verification data; decrypting the verification data with a private key of the server; identifying an account identity (ID) of the client from the decrypted verification data; generating a first logon token; generating a logon message comprising the first logon token and a uniform resource locator (URL) of the server; encrypting the logon message with a public key of the client; transmitting the logon message via the telecommunication link; receiving a logon request comprising the account ID and a second logon token; and determining whether the second logon token matches the first logon token.

22 Claims, 5 Drawing Sheets

Figure 1:
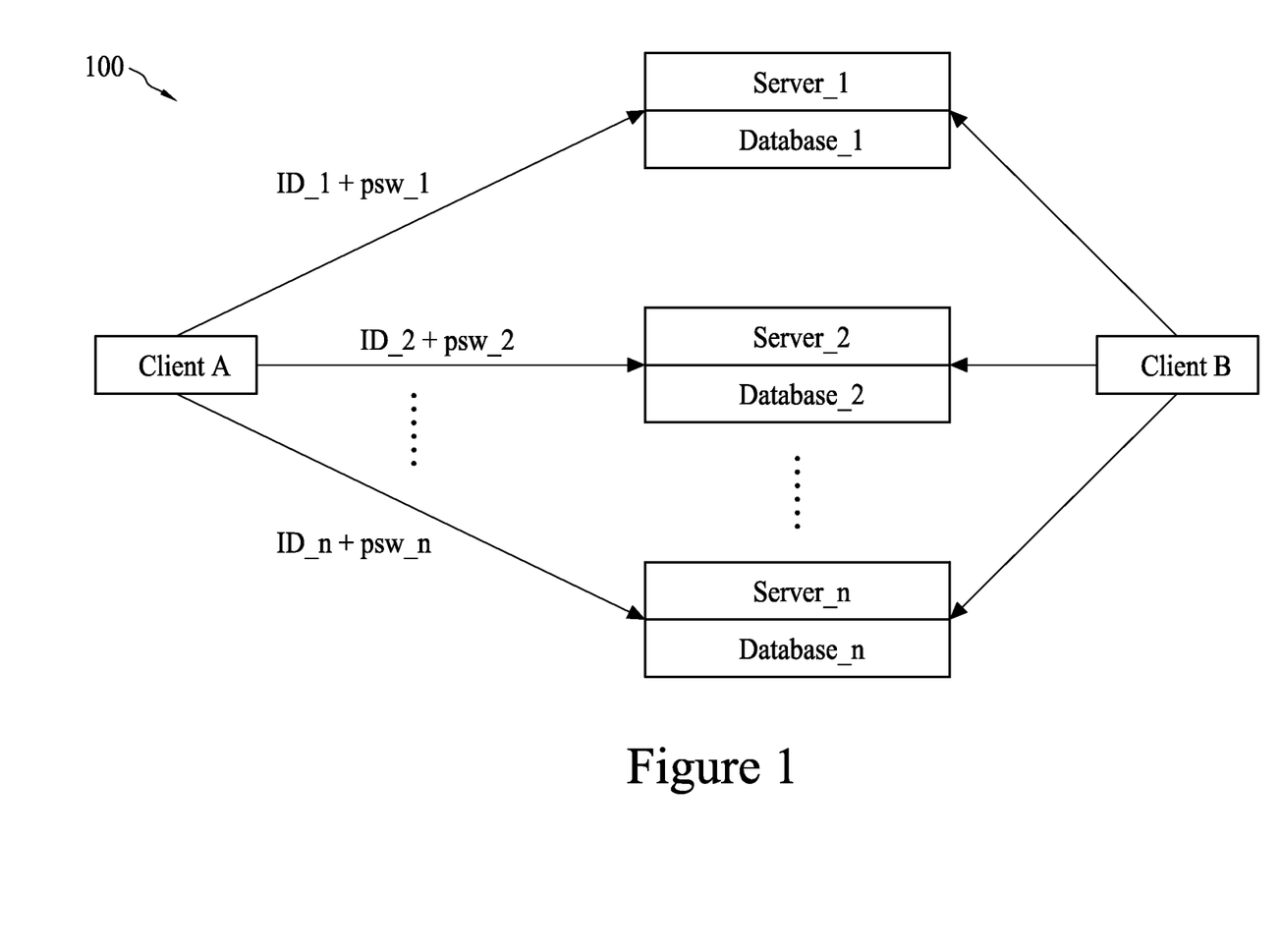
FIG. 1 is a schematic diagram of a client-server system in prior art.

Figure 5 ical world to the virtual world interactions, crimes and malicious actions have also grown in a rapid pace. In order to continuously develop internet services without compromising the security, many approaches have been proposed. Among others, passwords are commonly used nowadays. FIG. 1 is a schematic diagram of a client-server system 100 in prior art. Referring to FIG. 1, client A may interact with server_1 to server_n of different internet websites, using different sets of IDs and passwords, ID_1 associated with psw_n to ID_n associated with psw_n, respectively. However, setting different passwords for different websites may still run the risk of cyber crimes such as computer virus attack, data hacking and internet fraud by a malicious client B. It is desirable to have a method and system that can improve the existing password-based security mechanism.
METHOD OF MUTUAL VERIFICATION BETWEEN A CLIENT AND A SERVER

CROSS-REFERENCE TO RELATED APPLICATION

This application claims priority to U.S. Provisional Patent Application No. 62/018,089, filed Jun. 27, 2014 and entitled "Electronic Communication System and Method of Logging on an Account Using a Temporarily Generated Logon Token with Mutual Verification of Client and Server," which is incorporated herein by reference.

BACKGROUND

Internet applications and services have permeated our lives in many aspects. Typical internet activities include email, internet surfing, cloud storage, social network, electronic transaction, on-line shopping, etc. As more attention is taken from the real-world to the virtual world interactions, crimes and malicious actions have also grown in a rapid pace. In order to continuously develop internet services without compromising the security, many approaches have been proposed. Among others, passwords are commonly used nowadays. FIG. 1 is a schematic diagram of a client-server system 100 in prior art. Referring to FIG. 1, client A may interact with server_1 to server_n of different internet websites, using different sets of IDs and passwords, ID_1 associated with psw_n to ID_n associated with psw_n, respectively. However, setting different passwords for different websites may still run the risk of cyber crimes such as computer virus attack, data hacking and internet fraud by a malicious client B. It is desirable to have a method and system that can improve the existing password-based security mechanism.

SUMMARY

Existing password-based security mechanism has several drawbacks. From the viewpoint of website administrators or content providers, the website or server has to ensure data security and take measures to prevent data from stealing or tampering. In addition, as far as a user is concerned, he/she may choose a password from a complicated combination of alphabets or symbols. It is often cumbersome for a user to remember the specific ID/password content for logging on different websites. Furthermore, the user may be required to change his password frequently in order to lower the risk of password stealing.

Furthermore, the existing password-based security mechanism may only check the identity of a client, and provides no method for checking the identity of a server in order to protect the client. Additionally, as the domain name instead of the numeric IP Address of a server may often be used by the client to make connection to the server, the client could connect to a faked server due to domain name server (DNS) hackings such as DNS hijacking or DNS spoofing.

This invention proposes a token-based mechanism to alleviate the above problems. Embodiments of the present invention provide a method of mutual verification between a client and a server. The method comprises receiving a request via a telecommunication link, the request comprising an address of the server; receiving a verification data; decrypting the verification data with a private key of the server; identifying an account identity (ID) of the client from the decrypted verification data; generating a first logon token; generating a logon message comprising the first logon token; encrypting the logon message with a public key of the client; transmitting the logon message via the telecommunication link; receiving a logon request comprising the account ID and a second logon token; and determining whether the second logon token matches the first logon token.

Some embodiments of the present invention also provide a method of mutual verification between a client and a server. The method comprises transmitting a request via a telecommunication link to the server; generating a first verification token; generating a first verification data comprising an account ID of the client and the first verification token; encrypting the first verification data with a public key of the server; sending the encrypted first verification data; receiving a logon message; decrypting the logon message with a private key of the client; identifying a logon token, a second verification token and a URL of the logon server in the decrypted logon message; verifying the second verification token; and sending a logon request with the account ID and the logon token to the server in response to the second verification token determined as valid.

Embodiments of the present invention provide a system of mutual verification between a client and a server. The system comprises one or more processors and one or more programs including instructions. The instructions, when executed by the one or more processors, cause the system to receive a request via a telecommunication link, the request comprising an address of the server; receive a verification data; decrypt the verification data with a private key of the server; identify an account identity (ID) of the client from the decrypted verification data; generate a first logon token; generate a logon message comprising the first logon token and a uniform resource locator (URL) of the server; encrypt the logon message with a public key of the client; transmit the logon message via the telecommunication link; receive a logon request comprising the account ID and a second logon token; and determine whether the second logon token matches the first logon token.

Accordingly, the invention proposes a password-free system for identity verification by client and server. Public key infrastructure (PKI) is adopted to protect the client's confidential data. Moreover, instead of using any passwords, a token is generated and encrypted by a public key of the private-public key pair of the client or the server. The token is valid for a predetermined time, which is safer than a password valid for a relatively long time once created. In addition, tokens may be generated randomly and protected by the public-private key pairs in transmission. Hence, the identity of client or server can be verified in a more efficient and secure way than the password-based security systems.

Since password is eliminated, in the present invention, prior to a client's logon each time, a logon token is generated by a server for a client to log on. The logon token includes a text, a graphic, a sound, a voice, a video, or their combination. The logon token becomes obsolete once it has been used or expires after a predetermined time period. Considering the characteristics of random generation of the logon token each time prior to logging on and a relatively short valid period, the chances that the logon token is stolen are smaller than passwords. In addition, during the short valid period while the sever is waiting for the client to log on, the server may keep a hash value of the logon token instead of the original logon token in order for checking the logon token that the client uses to log on. Even if the hash value of the logon token is stolen, no malicious actions can take advantage of the stolen hash value.

BRIEF DESCRIPTION OF THE DRAWINGS

Aspects of the present invention are best understood from the following detailed description when read with the accompanying figures.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
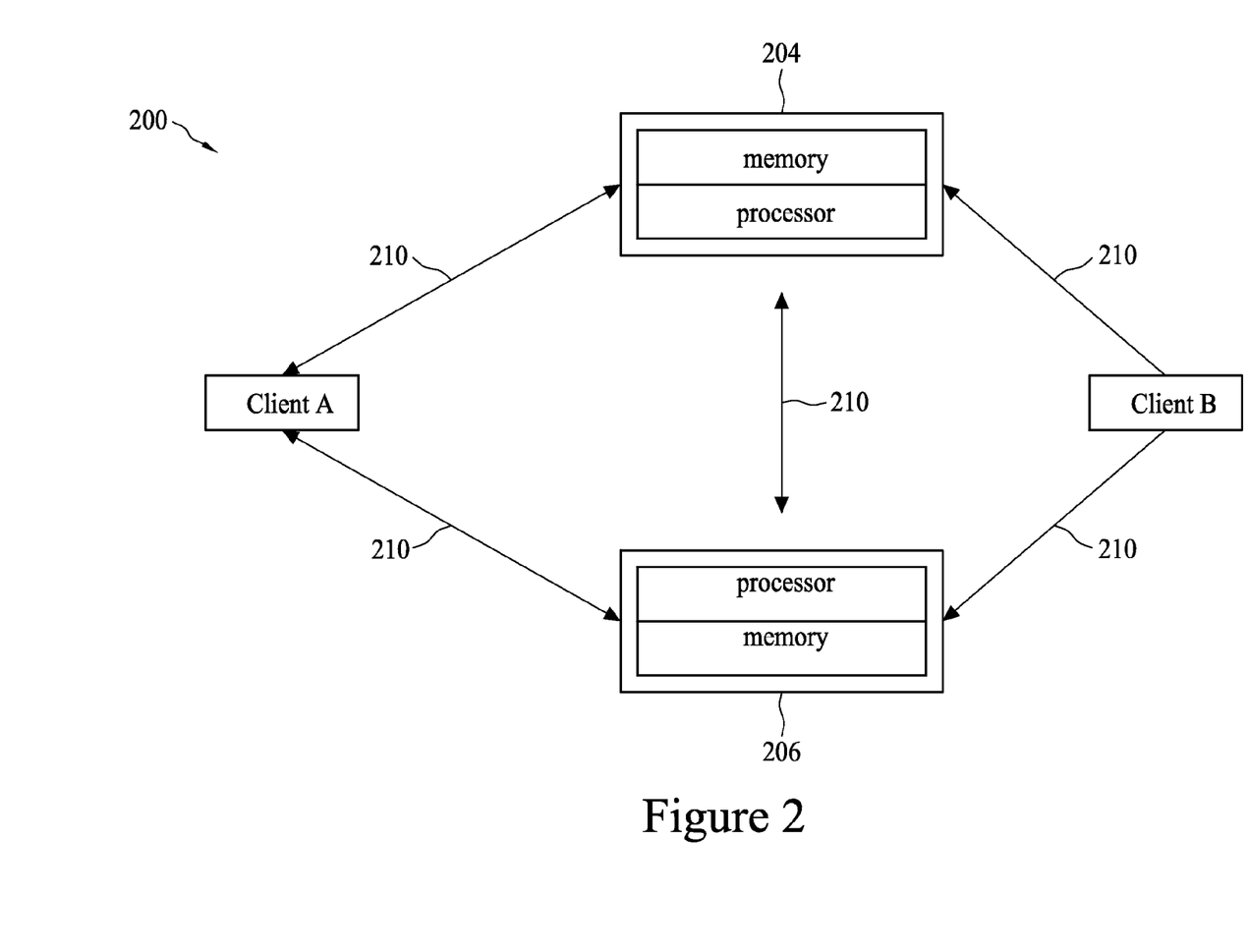
FIG. 2 is a schematic diagram of a client-server system in accordance with some embodiments of the present invention.

FIG. 2 is a schematic diagram of a client-server system 200 in accordance with some embodiments of the present invention. Referring to FIG. 2, the client-server system 200 comprises a Client A, an Administrating Server 204, a Log-on Server 206 and a telecommunication link 210. Client A is a local device such as a computer or a mobile phone used by an account holder with an intention to log on, and is capable of networking communication. Also, Client A may comprise processors or processing circuits for executing software instructions.

Administrating Server 204 is a host computer administrating Client A's account. Administrating Server 204 represents a computing instance or a combined hardware/software entity for providing services to clients. In some embodiments, Administrating Server 204 may be implemented in the form of a virtual machine. In some embodiments, Administrating Server 204 comprises an input interface, such as keyboard, mouse, or touch panel. Administrating Server 204 may also refer to a network node that can be accessed directly or indirectly through telecommunication link 210. Administrating Server 204 serves as a network portal for accepting requests from clients and acts according to a predefine procedures. In some embodiments, Administrating Server 204 may be a file server, a database server or an application server. Administrating Server 204 may include processors, communication terminals such as antenna port or network port. Administrating Server 204 may further comprise signal processing units for processing client's requests and performing service procedures, and storage units for storing program files or client's information.

Log-on server 206 is a host computer that allows Client A to log on. Log-on server 206 is connected to Client A and Administrating Server 204 via telecommunication link 210. Log-on Server 206 may share data for administrating accounts with Administrating Server 204. Although in FIG. 2 Log-on server 206 and Administrating Server 204 are shown as separate servers, their functions can be integrated or combined in a single server.

Telecommunication link 210 is configured to couple Client A and Administrating Server 204. Telecommunication link 210 may comprise a plurality of intermediate network nodes and connection routes to transmit and receive signals, messages or data. Telecommunication link 210 is formed of wired connections, such as Ethernet, cables, power line communication or any suitable medium. Alternatively, telecommunication link 210 may be formed in wireless environments such as cellular, WiFi, Bluetooth, or any suitable wireless communication systems. Furthermore, telecommunication link 210 may comprise stacks of transmission protocols and applications to process the inbound or outbound messages.

Client A and Administrating Server 204 are configured to transmit and receive encrypted data through telecommunication link 210. Further, Client A and Administrating Server 204 comprise memory units to store their respective private and public keys. Additionally, Client A and Administrating Server 204 each comprises hardware and/or software to implement encryption/decryption procedures.

A private-public key pair is used for data privacy between Client A and Administrating Server 204 so that data would not be revealed to others. Each one of Client A and Administrating Server 204 may act as a Sender or a Recipient in data transmission. Exemplary steps of using the private-public key pair to send data with privacy are provided as follows.

A) Sender encrypts data with Recipient's public key;
B) Sender sends the encrypted data to Recipient; and
C) Recipient decrypts the encrypted data with Recipient's private key to obtain data.

Since only Recipient has Recipient's private key, data privacy is sustained.

Exemplary steps of using the private-public key pair to verify an identity are as follows:

A) Sender encrypts data with Sender's private key;
B) Sender sends the encrypted data to Recipient; and
C) Recipient decrypts the encrypted data with Sender's public key.

If decryption is performed successfully, then the Sender's identity is verified since only Sender has Sender's Private Key.

Furthermore, exemplary steps of using the private-public key pair to verify the Sender's identity and sustain data privacy are as follows.

A) Sender encrypts data with Sender's private key to generate a first encrypted data;
B) Sender encrypts the first encrypted data with Recipient's public key to generate a second encrypted data;
C) Sender sends the second encrypted data to Recipient;
D) Recipient decrypts the second encrypted data with Recipient's private key to obtain the first encrypted data; since only Recipient has Recipient's Private Key, data privacy is sustained; and
E) Recipient decrypts the first encrypted data with Sender's public key to obtain data. If decryption succeeds, then Sender's identity is verified since only Sender has Sender's private key.

Moreover, exemplary steps of using the private-public key pair to verify the Sender's identity and sustain data privacy are as follows.

A) Sender encrypts data with Recipient's public key to generate a first encrypted data;

B) Sender encrypts the first encrypted data with Sender's private key to generate a second encrypted data;

C) Sender sends the second encrypted data to Recipient;

D) Recipient decrypts the second encrypted data with Sender's public key to obtain the first encrypted data. If decryption succeeds, then Sender's identity is verified since only Sender has Sender's private key. However, a third party other than Recipient may have Sender's public key to obtain the first encrypted data.

E) Recipient decrypts the first encrypted data with Recipient's private key to obtain data. Even though the third party may obtain the first encrypted data, data privacy is still sustained since only Recipient has Recipient's private key.

The private key or public key may not be used to encrypt or decrypt data directly. Instead, a symmetric key of symmetric cryptography is used to encrypt and decrypt data, and the private key or public key is used to encrypt or decrypt the symmetric key for the same purposes of identity verification and data privacy. For example, the steps of using the symmetric key and the private-public key pair to send data with privacy are as follows.

A) Sender encrypts data with a symmetric key;

B) Sender encrypts the symmetric key with Recipient's public key;

C) Sender sends the encrypted symmetric key and the encrypted data to Recipient;

D) Recipient decrypts the encrypted symmetric key with Recipient's private key to obtain the Symmetric Key; and E) Recipient decrypts the encrypted data with the symmetric key to obtain data.

Moreover, the steps of using symmetric key and private-public key pair to verify the identity of Sender that provides data are as follows.

A) Sender encrypts data with a symmetric key;

B) Sender encrypts the symmetric key with Sender's private key;

C) Sender sends the encrypted symmetric key and the encrypted data to Recipient;

D) Recipient decrypts the encrypted symmetric key with Sender's public key to obtain the symmetric key; and E) Recipient decrypts the encrypted data with the symmetric key to obtain data.

For convenience, only the private key and public key are described in data encryption or decryption hereafter in the present disclosure. However, the symmetric key still fall within the contemplated scope of the present invention.

In some embodiments according to the present invention, a method of using the private-public key pair and a verification token to verify the identity of Recipient (Administrating Server 204 in this example) by Sender (Client A in this example) is provided as follows.

A) Sender generates a first verification token that includes a text, a graphic, a sound, a voice, a video, or their combination;

B) Sender encrypts the first verification token with Recipient's public key;

C) Sender sends the encrypted first verification token to Recipient;

D) Recipient decrypts the encrypted first verification Token with Recipient's private key to obtain a second verification token that is supposed to be identical to the first verification token;

E) Recipient encrypts the second verification token with Sender's public key;

F) Recipient sends the encrypted second verification token to Sender;

G) Sender decrypts the encrypted second verification token with Sender's private key to obtain the second verification token; and H) Sender checks the second verification token against the first verification token; if the second verification token is identical to the first verification token, then Recipient's identity is verified.

According to some embodiments of the present invention, a method of mutual verification using a public-private key pair, a verification token and a logon token in a logon process among Client A, Administrating Server 204 and Logon Server 206 is provided as follows.

A) Client A generates a verification token, and then generates a verification data by encrypting Client A's account ID and the verification token with the public key of Administrating Server 204.

B) Client A makes connection to Administrating Server 204 using a domain name or IP Address of Administrating Server 204.

C) Client A sends the verification data to Administrating Server 204.

D) Administrating Server 204 decrypts the verification data with the private key of Administrating Server 204 in order to obtain Client A's account ID and the verification token.

E) Administrating Server 204 generates a logon token.

F) Administrating Server 204 encrypts the verification token (called a return verification token), a logon URL of Logon Server 206 and the logon token with the public key of Client A so as to generate a logon data. The URL may refer to a web page for logging on using an IP Address. An example of the Logon URL may be https://123.58.8.178/logon.jsp.

G) Administrating Server 204 sends the logon data to Client A.

H) Client A decrypts the logon data with the private key of Client A so that the return verification token from Administrating Server 204, the Logon URL, and the logon token can be identified.

I) Client A checks the return verification token from Administrating Server 204 against the original verification token to verify the identity of Administrating Server 204.

J) If identity of Administrating Server 204 is verified, Client A disconnects the connection with Administrating Server 204, invokes a web browser to open a logon web page at the logon URL, then enters the Client's account ID and the logon token to log on the logon web page.

Moreover, the verification process can be simplified in the absence of the verification token while the function of verifying Administrating Server 204 is maintained. The steps (F)-(H) of the above example are replaced by steps (K)-(O).

K) Administrating Server 204 encrypts the logon URL and the logon token with the private key of Administrating Server 204 to generate a first server data.

L) Administrating Server 204 encrypts the first server data with the public key of Client A to generate a second server data.

M) Administrating Server 204 sends the second server data to Client A.

N) Client A decrypts the second server data with the private key of Client A to obtain the first server data.

O) Client A decrypts the first server data with the public key of Administrating Server 204 and verifies the identity of Administrating Server 204. The logon URL and the logon token are thus obtained.

Since only Administrating Server 204 has its own private key to decrypt the verification token in step (D), the identity of Administrating Server 204 is verified if decryption of the first server data by Client A succeeds. In operations (K) and (L), the order of two encryption steps with the private key of Administrating Server 204 and the public key of Client A is interchangeable. Also, when the encryption order is changed, the decryption steps in (N) and (O) are adapted accordingly.

In the case when Client A verifies the identity of Administrating Server 204, Client A may invoke a web browser to open a web page at a URL for log on. The URL may be provided by Administrating Server 204 using an IP Address rather than domain name so that domain name server (DNS) hackings such as DNS hijacking or DNS spoofing may be eliminated. In some embodiments, invoking a web browser for opening a web page at a URL may be implemented in an automatic process to facilitate user operation, so that Client A needs not manually invoke a web browser and enter an IP Address.

After verifying the identity of Administrating Server 204, Client A and Administrating Server 204 may communicate with each other based on communication protocols without using web pages.

Client A and Administrating Server 204 are configured to function under a general public key infrastructure (PKI). As discussed previously, the essential enabler to the PKI is the public-private key pair. Both of Client A and Administrating Server 204 possess their respective public-private key pairs. The private key of the key pair is only known to the key pair owner, while the public keys are usually made public. Data encrypted with the private key of the key pair can be decrypted only with the public key of the same key pair. Reciprocally, data encrypted with the public key of the key pair can be decrypted only with the private key of the same key pair.

Referring to FIG. 2, when Client A establishes a secure channel with Administrating Server 204 with the help of the public-private key pair, Client A may encrypt data with the public key of Administrating Server 204 and sends the encrypted data to Administrating Server 204. On the receiving side, Administrating Server 204 decrypts the data with its private key. Any client that intends to communicate with Administrating Server 204 can take advantage of this approach to protect transmitted data in a simple way wherever the public key of Administrating Server 204 is available. Similarly, Administrating Server 204 may encrypt data with the public key of Client A and sends the encrypted data to Client A. Client A then decrypts the received data with its private key. Consequently, a simple yet secure two-way data exchange is achieved.

Conversely, in an existing symmetric key mechanism, where the encryption key and the decryption key are identical, the key should be made known to both sides only in a secure way. Additional effort should be made to ensure confidentiality of the key for both Client A and Administrating Server 204. Hence the risk of exposing key to unintended receiver and the corresponding maintenance cost for the symmetric key in transmission is relatively high. However, under the public key infrastructure, it is not necessary for each of the involving party, either Client A or Administrating Server 204, to exchange any key information before or during data transmission. Data protection is thus achieved without costly key management.

Referring to FIG. 2, when Client A logs on Administrating Server 204, Client A provides an account identity (ID) as a login request to Administrating Server 204. Subsequently, instead of asking for a password from Client A, Administrating Server 204 generates and sends a first token to Client A in response to the login request. In some embodiments, the first token is formed of a piece of data such as text, audio and video. In some embodiments, the first token is a string made of alphabets, symbols and numbers. The first token is generated randomly and is valid for a first period. In an embodiment, the first period is so short as 30 minutes in order to maintain high security. Further, the first token is encrypted by the public key of Client A. Client A has to login Administrating Server 204 with its account ID and the first token just received as user information. Hence, the first token is generated and used by Administrating Server 204 for verifying Client A.

Additionally, it is equally important for online transaction to ensure the genuineness of clients as well as the website. Thus, tokens serve another function for a login client to verify the visited website. Referring to FIG. 2, a second token is randomly generated by Client A and sent to Administrating Server 204. Moreover, the second token is encrypted with the public key of Administrating Server 204. Administrating Server 204 then decrypts the second token by its private key. Since the private key of Administrating Server 204 is only available to Administrating Server 204, the genuineness of Administrating Server 204 is thus ensured. As a result, the first and the second tokens are protected by encryption with the public key of a receiving party. Anyone other than the receiving party would find it difficult, if not impossible, to crack the encrypted token in a finite time shorter than the valid period of the tokens.

A sending party under this token-based mechanism has to encrypt data with a public key of the receiving party. Therefore, the public keys of Client A and Administrating Server 204 are readily accessible in the token-based logon mechanism. In some embodiments, when Client A sends a request for log-on to a server, Client A can also provide his public key along with the request. In some embodiments, Administrating Server 204 provides its public key on the internet. In another embodiment, Administrating Server 204 provides an activation code to Client A so that Client A can submit the public key of Client A to Administrating Server 204. The activation code is used by Administrating Server 204 to verify the identity of Client A when submitting the public key of Client A.

Figure 3:
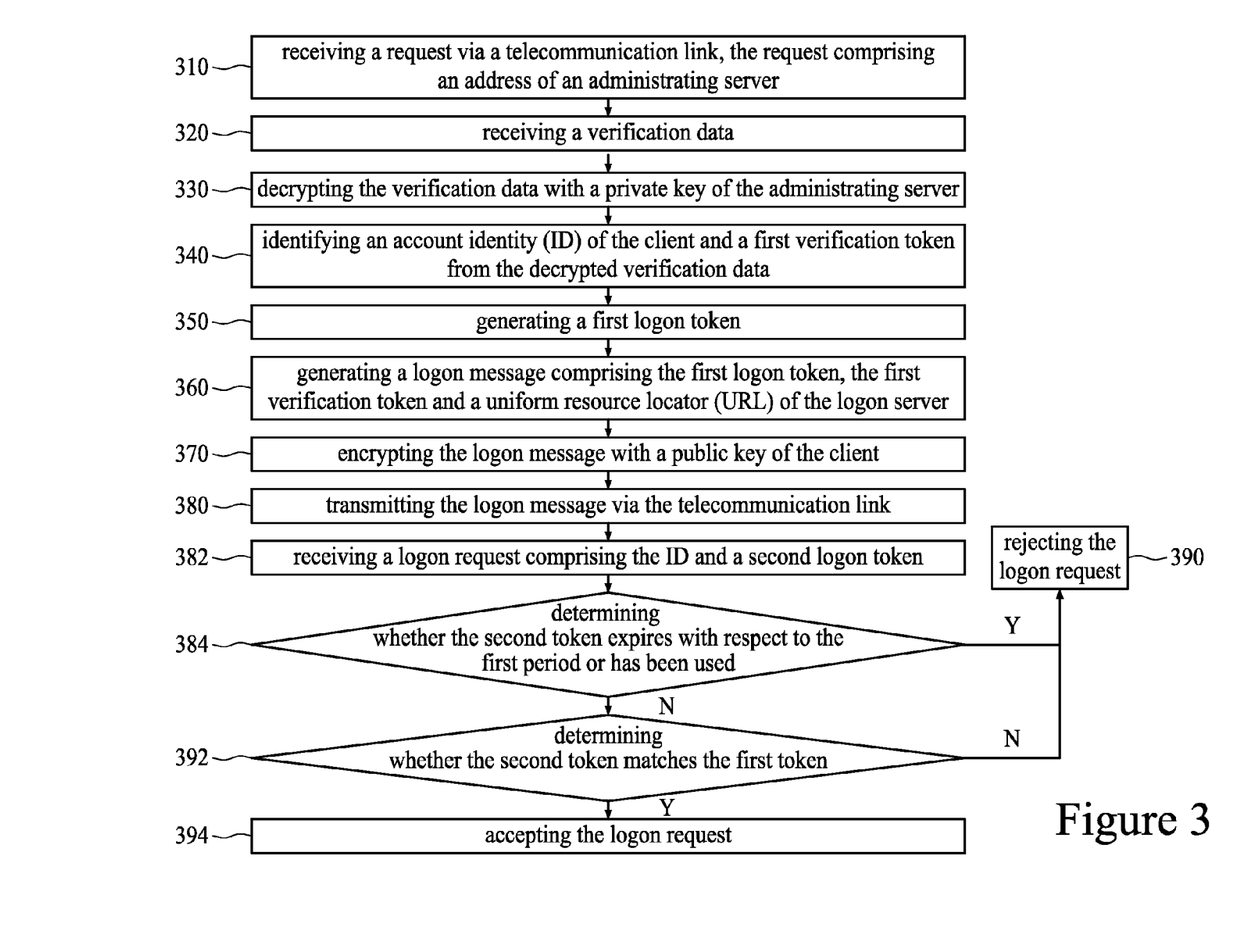
FIG. 3 is a flow diagram showing a method of mutual verification between a client and a server, in accordance with some embodiments of the present invention.

FIG. 3 is a flow diagram showing a method of mutual verification between a client and a server, in accordance with some embodiments of the present invention.

In operation 310, a request is received by an Administrating Server 204 via telecommunication link 210. The request comprises an address of Administrating Server 204 and an account identity (ID) of Client A. Client A is capable of generating a private-public key pair of its own. In addition, Administrating Server 204 is also capable of generating its own private-public key pair. In some embodiments, the request is encrypted by the public key of Administrating Server 204.

In operation 320, a verification data is received by Administrating Server 204. The verification data, having been generated by Client A, includes a first verification token and the account identity (ID) of Client A. The first verification token is generated by Client A prior to the verification data, and may include text, alphabets, symbols, numbers, audio, video and a combination thereof. Next, the verification data is decrypted with a private key of Administrating Server 204 in operation 330.

In operation 340, the first verification token and the account identity (ID) of Client A are identified from the decrypted verification data. If the attempt to identify the first verification token fails and thereafter no such first verification token can be returned to Client A, the server Client A currently communicates with is deemed as invalid.

In operation 350, a first logon token is generated by Administrating Server 204. The first logon token is generated at random, and may include text, alphabets, symbols, numbers, audio, video and a combination thereof. Further, the first logon token is set to be valid for a first period. That means the first logon token would be deemed obsolete and thus becomes invalid when the first period expires, regardless whether the received logon token matches the original first logon token.

In operation 360, a logon message is generated, which comprises the first logon token, the first verification token and optionally a uniform resource locator (URL) of Logon Server 206. The URL comprises a domain name or an internet protocol (IP) address of Logon Server 206. The type of the IP address is either a fixed IP address or a floating IP address. The IP address allows Client A to log on the Server 206 using the numerical IP address instead of the corresponding domain name. A domain name server (DNS) is designated for interpreting between the domain name and the numerical IP address of an internet node. Although the domain name of a website may facilitate website management for users, however, the domain name server (DNS) may be liable to hijacking or spoofing. For example, Client B (FIG. 2) may use the hijacked DNS to intercept user packets and direct the user to a faked website. Therefore, Administrating Server 204 may voluntarily provide or is required to provide Client A with its numerical IP address to ensure a secure communication between Client A and Logon Server 206.

In operation 370, the logon message is encrypted with a public key of Client A. Then in operation 380, the logon message is transmitted to Client A via telecommunication link 210 by Administrating Serve 204.

Subsequently, in operation 382, a logon request comprising a second logon token and the account ID of Client A is received from Client A. The second logon token is identified and used by Client A to be verified by Administrating Server 204.

In operation 384, it is determined whether the second logon token has expired or has been used. It affirmative, in operation 390, the logon request is rejected by Administrating Server 204. If not, then in operation 392, it is determined whether the second logon token matches the first logon token. If the second logon token matches the first logon token, then in operation 394, the logon request is accepted. If not, it is determined that the second logon token is invalid. The logon request is thus rejected in operation 390. In the present embodiment, operations 384 and 392 are interchangeable.

Figure 4:
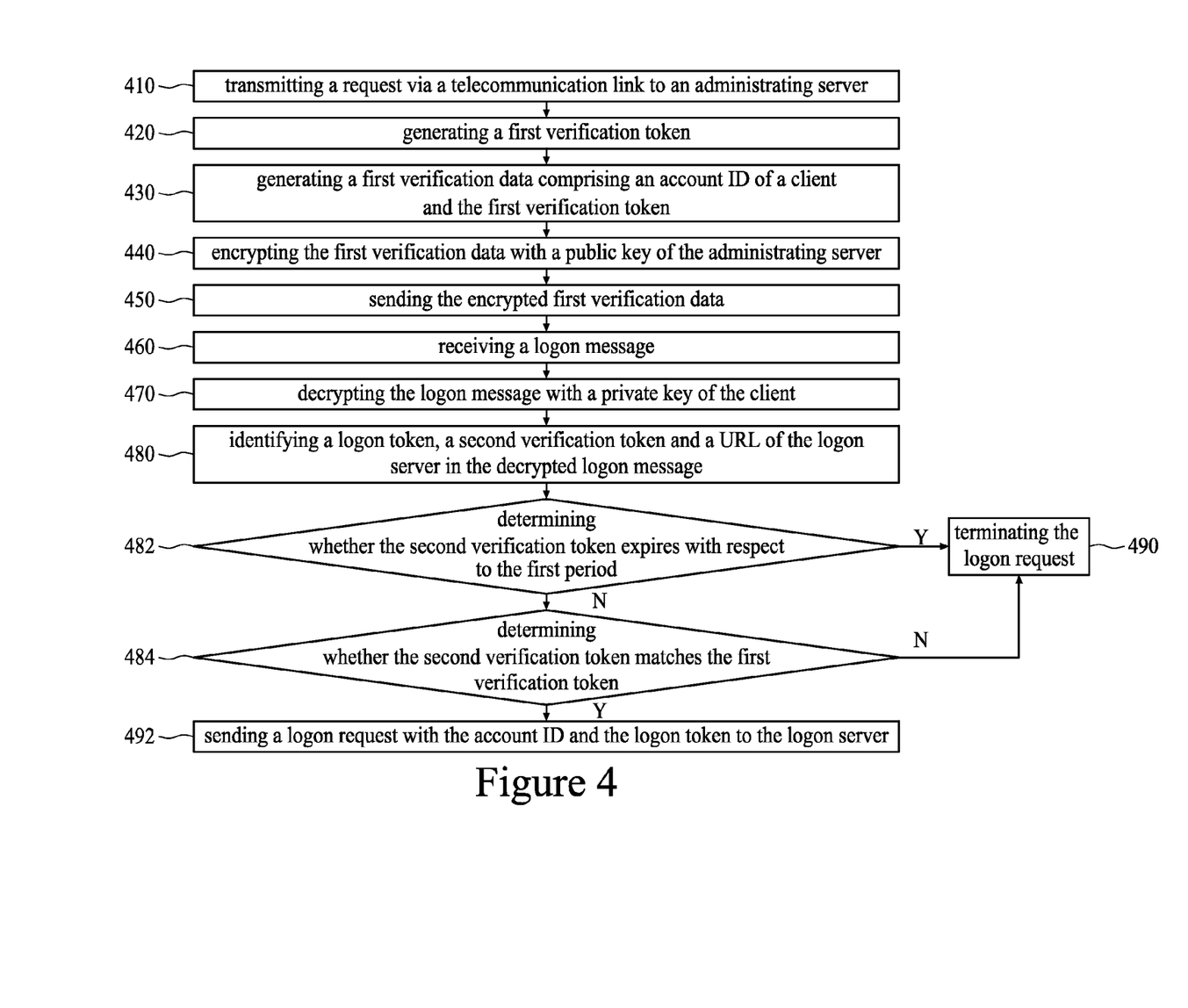
FIG. 4 is a flow diagram showing a method of mutual verification between a client and a server, in accordance with some embodiments of the present invention.

FIG. 4 is a flow diagram showing a method of mutual verification between a client and a server, in accordance with some embodiments of the present invention.

In operation 410, a request for logging on Administrating Server 204 is transmitted by Client A via telecommunication link 210 to Administrating Server 204.

In operation 420, a first verification token is generated by Client A.

In operation 430, a first verification data is generated, which comprises the first verification token and an account ID of Client A.

In operation 440, the first verification data is encrypted with a public key of Administrating Server 204. Next, in operation 450, the encrypted first verification data is sent to Administrating Serve 204.

In operation 460, a logon message is received by Client A from Administrating Server 204. The logon message, having been generated by Administrating Server 204, includes a logon token, a second verification token and optionally a URL of Logon Server 206. The second verification token is generated by Administrating Server 204, and is supposed to be identical to the first verification token if decryption is succeeded by Administrating Server 204. In operation 470, the logon message is decrypted with a private key of Client A.

In operation 480, the logon token, the second verification token and optionally the URL of Logon Server 206 are identified in the decrypted logon message. The logon token is generated at random by Administrating Server 204. Further, the logon token is set to be valid for a first period. That means the logon token would be deemed obsolete and thus becomes invalid if the first period expires regardless whether the received logon token matches the original logon token.

Subsequently, the second verification token is verified by Client A. In operation 482, it is determined whether the second verification token has expired. If affirmative, in operation 490, the logon request is terminated by Client A. If not, then in operation 484, it is determined whether the second verification token matches the first verification token. If affirmative, in operation 492, the logon request with the account ID and the logon token is sent from Client A to Logon Server 206. If not, in operation 490 the logon request is terminated by Client A. In the present embodiment, operations 482 and 484 are interchangeable.

In some embodiments, web pages may be used for Client A to communicate with Administrating Server 204 as described in the above steps. However, after verifying the identity of Administrating Server 204, Client A and Administrating Server 204 may use another form of communication without using web pages such as using graphic user interface built-in in the software running on Client A or just using communication protocols without graphic user interface.

Figure 5:
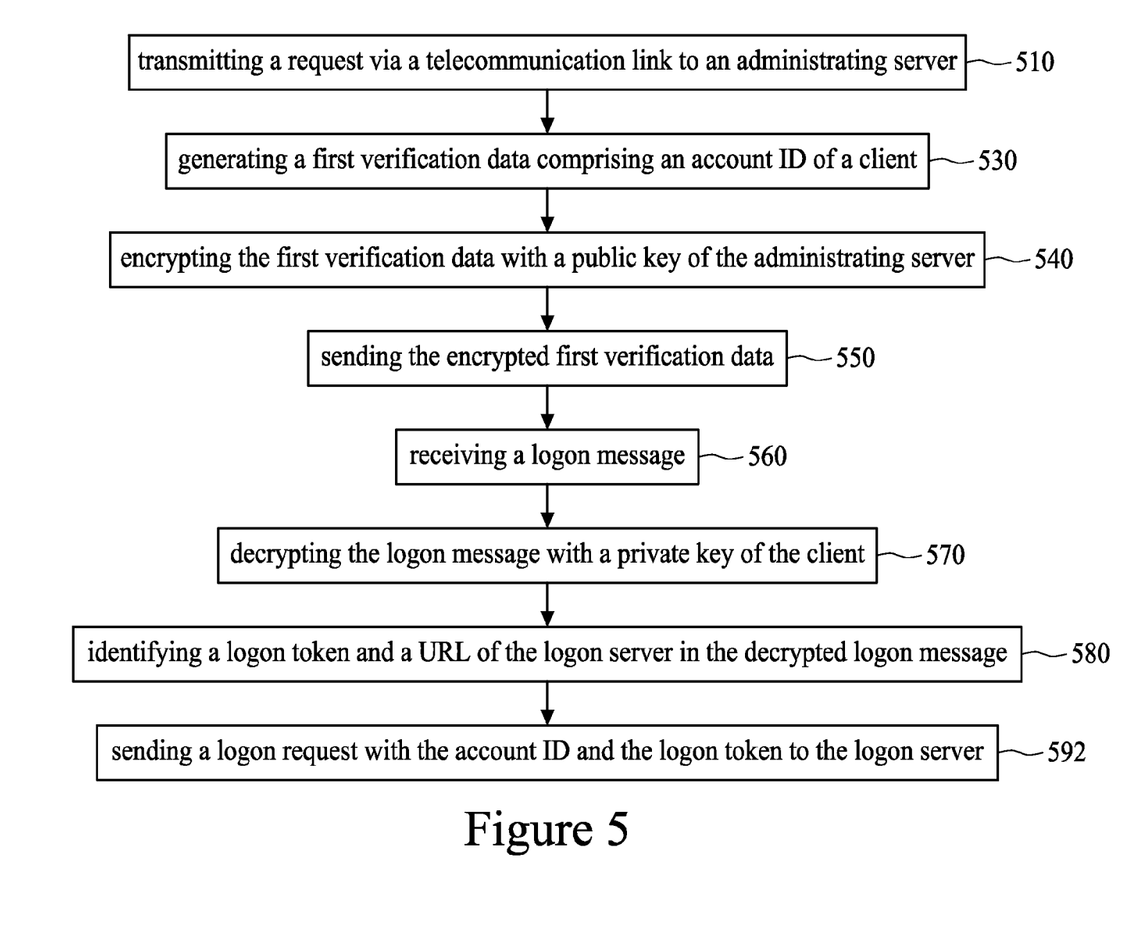
FIG. 5 is a flow diagram showing a method of mutual verification between a client and a server, in accordance with some embodiments of the present invention.

FIG. 5 is a flow diagram showing a method of mutual verification between a client and a server, in accordance with some embodiments of the present invention. Compared to the embodiments illustrated in FIG. 4, in the method of FIG. 5 Client A does not generate any verification token for verifying the identity of Administrating Server 204, while instead Administrating Server 204 encrypts a logon message with a private key thereof so that Client A can verify the identity of Administrating Server 204 with a public key of Administrating Server 204.

In operation 510, a request for logging on Administrating Server 204 is transmitted by Client A via a telecommunication link 210 to Administrating Server 204. In operation 530, a first verification data is generated, which comprises an account ID of Client A.

In operation 540, the first verification data is encrypted with a public key of Administrating Server 204. Then in operation 550, the encrypted first verification data is sent to Administrating Server 204.

In operation 560, a logon message is received by Client A from Administrating Server 204. The logon message, having been generated by Administrating Server 204, includes a logon token and optionally a URL of Logon Server 206. The logon message is encrypted with the public key of Client A for sustaining data privacy thereof. In one embodiment, before the logon message is encrypted with the public key of Client A, it is encrypted with a private key of Administrating Server 204 for verifying the identity of Administrating Server 204. Subsequently, in operation 570, the logon message is decrypted with a private key of Client A. In the situation where the logon message is encrypted with the private key of Administrating Server 204, the logon message is further decrypted with the public key of Administrating Server 204.

In operation 580, the logon token and optionally the URL of Logon Server 206 are identified from the decrypted logon message.

In operation 592, a logon request using the account ID and the logon token is sent to Logon Server 206.

The token-based verification mechanism as illustrated in the present disclosure enjoys several advantages. For example, the logon token is temporarily generated at random prior to a logging on procedure each time. The logon may be set to be obsolete once it has been used or expires after a time period. As a result, the token-based verification mechanism according to the present invention is different from saving passwords in a server's database for a long time and the passwords are liable to be stolen.

Also, the server may even keep a hash-value of the logon token rather than the original logon token. In the event that the server is hacked during a very short period of time while waiting for the client to log on, the stolen hash-value is useless. As a result, malicious intentions of logging on are prevented.

Moreover, data including the logon token transferred between the client and the server is protected by the private-public key pairs without revealing to others. Additionally, not only the server verifies the identity of the client, but also the client verifies the identity of the server.

In addition, the client may use a domain name to make an initial connection to the server for convenient use, and the identity of the server is verified by the client prior to logging on. In the case where a logon URL is sent to the client, after verifying the identity of the server, the client uses an IP Address rather than the domain name to make connection for logging on, which avoids potential hackings such as DNS hijacking, DNS spoofing, etc.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of mutual verification between a client and a server, the method comprising:
generating a first logon token by the server during a user-verification phase;
generating a logon message comprising the first logon token;
encrypting the logon message with a public key of the client;
transmitting the logon message to the client;
receiving from the client a logon request comprising a second logon token; and
determining whether the second logon token matches the first logon token.

2. The method according to claim 1, further comprising setting the first logon token to be valid for a first period.

3. The method according to claim 2, further comprising determining whether the second logon token expires after the first period or has been used.

4. The method according to claim 1, wherein the logon message further comprises a uniform resource locator (URL) of the server.

5. The method according to claim 4, wherein the URL comprises a fixed internet protocol (IP) address or a floating IP address of the server.

6. The method according to claim 1, before generating the first logon token, further comprising:
receiving a verification data;
decrypting the verification data with a private key of the server; and
identifying a verification token from the decrypted verification data.

7. The method according to claim 6, further comprising generating the logon message comprising the verification token.

8. The method according to claim 1, wherein before encrypting the logon message with a public key of the client, the method further comprises encrypting the logon message with a private key of the server.

9. A method of mutual verification between a client and a server, the method comprising:
generating a first verification token by the client during a server-verification phase;
generating a first verification data comprising the first verification token;
encrypting the first verification data with a public key of the server;
sending to the server the encrypted first verification data;
receiving a logon message from the server;
decrypting the logon message with a private key of the client;
identifying a second verification token and a logon token in the decrypted logon message; and
determining whether the second verification token matches the first verification token,
wherein the logon token is generated by the server for user verification.

10. The method according to claim 9, wherein the first verification token is set to be valid for a first period.

11. The method according to claim 10, further comprising determining whether the second verification token expires after the first period.

12. The method according to claim 9, wherein the logon message further comprises a uniform resource locator (URL) of the server.

13. The method according to claim 12, wherein the URL comprises a fixed internet protocol (IP) address or a floating IP address of the server.

14. The method according to claim 9, further comprising sending a logon request comprising an account identity (ID) of the client and the logon token.

15. A system of mutual verification between a client and a server, the system comprising:
one or more processors; and one or more programs including instructions which, when executed by the one or more processors, cause the system to:

generate a first logon token by the server during a user-verification phase;

generate a logon message comprising the first logon token;

encrypt the logon message with a public key of the client;

transmit the logon message to the client;

receive from the client a logon request comprising a second logon token; and determine whether the second logon token matches the first logon token.

16. The system according to claim 15, wherein the instructions further cause the system to set the first logon token to be valid for a first period.

17. The system according to claim 16, wherein the instructions further cause the system to determine whether the second logon token expires after the first period or has been used.

18. The system according to claim 15, wherein the logon message further comprises a uniform resource locator (URL) of the server.

19. The system according to claim 18, wherein the URL comprises a fixed internet protocol (IP) address or a floating IP address of the server.

20. The system according to claim 15, the instructions further cause the system to:

receive a verification data before generating the first logon token;

decrypt the verification data with a private key of the server; and identify a verification token from the decrypted verification data.

21. The method according to claim 15, wherein before encrypting the logon message with a public key of the client, the instructions further cause the system to encrypt the logon message with a private key of the server.

22. The method according to claim 15, wherein the server includes a logon server and an administrating server.

* * * * *